United States Patent
Shen et al.

(10) Patent No.: US 12,352,664 B2
(45) Date of Patent: Jul. 8, 2025

(54) METHOD AND SYSTEM FOR DIAGNOSING HIGH-ENTHALPY SHOCK TUNNEL PARAMETERS

(71) Applicant: China Academy of Aerospace Aerodynamics, Beijing (CN)

(72) Inventors: Junmou Shen, Beijing (CN); Meixiao Hu, Beijing (CN); Jian Gong, Beijing (CN); Zhongjie Shao, Beijing (CN); Wei Chen, Beijing (CN); Xiangyu Yi, Beijing (CN); Hongbo Lu, Beijing (CN); Huazhen Song, Beijing (CN); Shuai Wen, Beijing (CN); Dapeng Yao, Beijing (CN); Jian Pang, Beijing (CN); Feng Ji, Beijing (CN)

(73) Assignee: China Academy of Aerospace Aerodynamics, Beijing (CN)

( * ) Notice: Subject to any disclaimer, the term of this patent is extended or adjusted under 35 U.S.C. 154(b) by 0 days.

(21) Appl. No.: 18/023,679

(22) PCT Filed: Dec. 30, 2021

(86) PCT No.: PCT/CN2021/142954
§ 371 (c)(1),
(2) Date: Feb. 27, 2023

(87) PCT Pub. No.: WO2023/123180
PCT Pub. Date: Jul. 6, 2023

(65) Prior Publication Data
US 2024/0310240 A1    Sep. 19, 2024

(30) Foreign Application Priority Data

Dec. 27, 2021 (CN) .......................... 202111619055.7

(51) Int. Cl.
*G01M 9/04*     (2006.01)
*G01M 9/06*     (2006.01)
*G01M 9/08*     (2006.01)

(52) U.S. Cl.
CPC .............. *G01M 9/04* (2013.01); *G01M 9/067* (2013.01); *G01M 9/08* (2013.01)

(58) Field of Classification Search
None
See application file for complete search history.

(56) References Cited

FOREIGN PATENT DOCUMENTS

| CN | 102937655 A | 2/2013 |
|----|-------------|--------|
| CN | 107806977 A | 3/2018 |

(Continued)

OTHER PUBLICATIONS

PCT/CN2021/142954, Jun. 29, 2022, International Search Report.
International Search Report for International Application No. PCT/CN2021/142954 dated Jun. 29, 2022.

*Primary Examiner* — Peter J Macchiarolo
*Assistant Examiner* — Jermaine L Jenkins
(74) *Attorney, Agent, or Firm* — Wolf, Greenfield & Sacks, P.C.

(57) ABSTRACT

A method and a system for diagnosing high-enthalpy shock tunnel flow field parameters are provided. In the method, the parameters of the reservoir at the end of shock tunnel and nozzle free flow are measured by using a contact measurement technology and a non-contact spectrum measurement technology to diagnose the high-enthalpy shock tunnel flow field. With the method, not only flow field temperature, pressure, component category and component concentration, but also non-equilibrium state information of the flow field and the effective wind tunnel working time can be obtained.

13 Claims, 2 Drawing Sheets

(56) References Cited

FOREIGN PATENT DOCUMENTS

| | | | | |
|---|---|---|---|---|
| CN | 111024357 | A | 4/2020 | |
| CN | 112067241 | A | 12/2020 | |
| CN | 112067243 | A | 12/2020 | |
| CN | 112067241 | B * | 8/2022 | ............ G01M 9/06 |
| CN | 112649172 | B * | 12/2022 | ............ G01M 9/04 |
| JP | H06-258177 | A | 9/1994 | |
| WO | WO-2024148899 | A1 * | 7/2024 | ............ G01M 9/04 |

* cited by examiner

METHOD AND SYSTEM FOR DIAGNOSING HIGH-ENTHALPY SHOCK TUNNEL PARAMETERS

The present application is a national phase stage filing under 35 U.S.C. § 371 of International Patent Application Serial No. PCT/CN2021/142954, filed on Dec. 30, 2021, which claims priority to Chinese Patent Application No. 202111619055.7, titled "METHOD AND SYSTEM FOR DIAGNOSING HIGH-ENTHALPY SHOCK TUNNEL PARAMETERS", filed on Dec. 27, 2021 with the China National Intellectual Property Administration. The contents of these applications are incorporated herein by reference in their entireties.

FIELD

The present disclosure relates to a method and system for diagnosing high-enthalpy shock tunnel parameters, and pertains to the field of hypersonic aerodynamic test.

BACKGROUND

With the constant advancement of human aerospace technology, there may be various supersonic and hypersonic re-entry flying objects in the near-Earth space. When the re-entry object returns to the atmosphere at a high speed, there is a strong friction between the re-entry object and the atmosphere to form a strong detached shock wave at the front end of the re-entry object. Under the strong compression of the shock wave, a large amount of kinetic energy of the aircraft is converted into heat energy, forming a high-enthalpy flow, causing complex physical and chemical changes such as gas molecule vibration energy excitation, dissociation, recombination and ionization.

In order to study the re-entry phenomena of such re-entry object, in general, a high-enthalpy shock tunnel is used for physical ground testing of re-entry. In the physical ground testing of re-entry, the high-enthalpy flow is characterized by strong spontaneous emission. Since the air is dissociated or even ionized in that case, it contents extremely rich information. Therefore, it is valuable experimental data for studying the equilibrium and non-equilibrium properties of the flow.

The vibration of gas molecules in high-enthalpy flow can cause energy level transition during complex physical and chemical changes such as excitation, dissociation, recombination, ionization, resulting in energy changes, which make molecules have specific spectral lines. To this end, a contact measurement technology and a non-contact spectrum technology are used to diagnose high-enthalpy flow gas information to obtain parameters such as translational temperature, vibrational temperature, gas component and flow time of the free flow in the high-enthalpy shock tunnel, and multi-component and multi-temperature numerical simulation technology is combined, to provide a feasible approach tested by experiments for the diagnosis of parameters in the high-enthalpy shock tunnel reservoir and free flow. The present disclosure is developed based on the above background.

SUMMARY

The present disclosure aims to propose a method and a system for diagnosing high-enthalpy shock tunnel flow field parameters, by using contact measurement technology, laser schlieren technology, non-contact absorption spectrum technology, non-contact emission spectrum technology and multi-component and multi-temperature numerical simulation technology, in light of the observation that a high-enthalpy shock tunnel produces high-temperature, high-pressure test gas and short effective flow field time. The accuracy of the high-enthalpy shock tunnel test flow field is improved to obtain more accurate free flow parameters.

The technical solution of the present disclosure is as follows. A system for diagnosing high-enthalpy shock tunnel flow field parameters is provided, which includes multiple piezoelectric sensors, a total pressure sensor, an absorption spectrum system, an emission spectrum system, a pitot pressure probe, a static pressure probe, a stagnation point heat flow probe, a first data processing system and a second data processing system.

The piezoelectric sensors are installed on a shock tube and the total pressure sensor is installed at the end of the shock tube; the non-contact absorption spectrum system and a collimator and a detector of the emission spectrum system are installed near the total pressure sensor at the end of the shock tube, and the non-contact absorption spectrum system and a collimator and a detector of the emission spectrum system are installed in a test section; the pitot pressure probe, the static pressure probe, and the stagnation point heat flow probe are installed on a bracket in the test section to measure pitot pressure, static pressure, and stagnation point heat flow in the flow field of the test section; the data measured by the non-contact absorption spectrum system and the emission spectrum system, the pitot pressure probe, the static pressure probe, and the stagnation point heat flow probe are sent to the first data processing system and the second data processing system via optical fibers or data lines for data processing.

The measurement wavelength band of the emission spectrum system is from 0.1 μm to 6 μm, which depends on spectral information of the free flow parameters of a reservoir at the end the shock tube and a high-enthalpy nozzle.

The non-contact absorption spectrum system is configured to measure concentrations of components NO and O in the reservoir at the end of the shock tube and the nozzle free flow by using NO and O lasers; a near-infrared detection device is configured to measure temperature in the reservoir at the end of the shock tube and temperature of the free flow at the high-enthalpy nozzle via a spectral line, where the near-infrared detection device is installed on the cross bracket in the test section, where two spectral lines are used to measure velocity, and the angle between the two optical paths for the velocity measurement is between 30° and 60°.

A laser schlieren system is configured to capture a clear shock detached distance at a sphere head by penetrating the self-illumination flow field at the high-enthalpy nozzle outlet and filtering the self-illumination; a monochromatic laser source is configured to penetrate strong light and high temperature region, and a clear flow field structure is observable through a matching filter arranged in front of the camera.

The first data collection system and the second data collection system are each configured with a PXI test platform having a collection frequency greater than 100 kHz, wherein multiple sets of PXIe chassis are cascaded to implement a multi-channel cascade.

A method for diagnosing high-enthalpy shock tunnel flow field parameters, includes:
  step 1, installing a plurality of piezoelectric sensors on a shock tube and a total pressure sensor at the end of the shock tube; installing a non-contact absorption spectrum system together with a collimator and a detector of an emission spectrum system near the total pressure sensor at the end of the shock tube, and installing the non-contact absorption spectrum system together with a collimator and a detector of the emission spectrum system in a test section; installing a pitot pressure probe, a static pressure probe, and a stagnation point heat flow probe on a bracket in the test section to measure pitot pressure, static pressure, and stagnation point heat flow in the flow field of the test section; and sending the data measured by the non-contact absorption spectrum system and the emission spectrum system, the pitot pressure probe, the static pressure probe, and the stagnation point heat flow probe to a first data processing system and a second data processing system via optical fibers or data lines for data processing;

step 2, measuring a time interval $\Delta t$ for an incident shock wave passing through the piezoelectric sensors by using the piezoelectric sensors arranged on the upper wall of the shock tube, and calculating a velocity V of the incident shock wave by $V=\Delta L/\Delta t$ based on a distance $\Delta L$ between the piezoelectric sensors;

step 3, measuring, by using the total pressure sensor arranged on the wall of the end of the shock tube, a total pressure $P_0$ in a reservoir at the end of shock tube after the incident shock wave is reflected;

step 4, measuring translational temperatures and NO/O component concentrations of gas in the reservoir at the end of the shock tube and free flow gas in a high-enthalpy nozzle by using the non-contact absorption spectrum system;

step 5, measuring vibrational temperatures and component spectral information of the gas in the reservoir at the end of the shock tube and the free flow gas in the nozzle by using the emission spectrum system;

step 6, installing a sphere on the cross bracket in the test section, and measuring the structure of the flow field around the sphere by using the laser schlieren system, to obtain a distance of the shock wave at a head of the sphere;

step 7, installing the pitot pressure probe, the static pressure probe and the stagnation point heat flow probe on the cross bracket in the test section to obtain the pitot pressure, the static pressure and the stagnation point heat flow of the flow field;

step 8, calculating parameters of the reservoir at the end of the shock tube under high temperature condition (2000K~10000K) based on the velocity V of the incident shock wave measured in the step 2, the total pressure $P_0$ in the reservoir at the end of the shock tube measured in the step 3, a thermodynamic numerical model of high temperature air and quasi-one-dimensional shock tube theory, and comparing the parameters of the reservoir at the end of the shock tube with the temperature and NO/O component concentration in the reservoir at the end of the shock tube measured in the step 4; if a difference between two data is greater than a predetermined threshold a, modifying the thermodynamic numerical model and performing iteration until the difference between the two data is equal to or less than the predetermined threshold a;

step 9, calculating initial condition of the high-enthalpy nozzle flow field by configuring the parameters of the reservoir at the end of the shock tube completed the iteration in the step 8 as input values, calculating the flow field of the high-enthalpy nozzle by using a multi-component and multi-temperature thermochemical non-equilibrium numerical simulation method to obtain outlet parameters at the high-enthalpy nozzle, and comparing the outlet parameters at the high-enthalpy nozzle with the measured data in steps 3 to 7; if a difference between two data is greater than predetermined threshold b, modifying the numerical model and performing iteration until the difference between the two data is equal to or less than the predetermined threshold b.

The method for diagnosing high-enthalpy shock tunnel flow field parameters, further includes: measuring gas components of the high-enthalpy nozzle reservoir and the nozzle outlet free flow by using the emission spectrum system, and determining an effective wind tunnel working time t1 according to whether or not a driver gas component exists;

determining an effective wind tunnel working time t2 by measuring NO/O concentrations of the high-enthalpy nozzle reservoir and the nozzle outlet free flow using the non-contact absorption spectrum system; and determining an effective wind tunnel working time t3 according to a shock detached distance at a sphere head, which is captured by the laser schlieren system, and taking a minimum one among the time t1, time t2 and time t3 as the effective wind tunnel working time.

A wavelength range of the monochromatic laser source in the laser schlieren system is from 520 nm to 720 nm.

The beneficial effect of the present disclosure compared with conventional art is described as follows.

In the present disclosure, contact measurement technology, laser schlieren technology, non-contact absorption spectrum measurement technology, non-contact emission spectrum measurement technology and multi-component and multi-temperature numerical simulation technology are utilized to conjointly diagnose the parameters of the reservoir at the end of shock tube and the nozzle free flow in the high-enthalpy shock tunnel. Not only the flow field temperature, pressure, flow field component category and component concentration can be obtained, but also the flow field non-equilibrium state information and the effective wind tunnel working time can be obtained. A high-enthalpy flow field parameter measurement platform can be established by using the method for diagnosing high-enthalpy shock tunnel flow field parameters according to the present disclosure, which has extremely high sensitivity, continuous time resolution and rapid time response and is preferable.

BRIEF DESCRIPTION OF THE DRAWINGS

FIG. 2 is a schematic diagram illustrating a method for diagnosing high-enthalpy shock tunnel flow field parameters according to the present disclosure. In which,

1 Shock tube; 2 Diaphragm; 3 High-enthalpy nozzle; 4 Test section; 5 Cross bracket for installing sensors; 6 Optical window; 7 Absorption spectrum system; 8 Data processing system; 9 Emission spectrum system; 10 Data processing system.

DETAILED DESCRIPTION OF EMBODIMENTS

The following describes the present disclosure in detail, and the features and advantages of the present disclosure will become clearer and more clarified along with these descriptions.

The word "exemplary" is used exclusively herein to mean "serving as an example, embodiment, or illustration." Any embodiment described herein as "exemplary" is not necessarily to be construed as being superior to or better than other embodiments. Although various aspects of the embodiments are shown in drawings, the drawings are not necessarily drawn to scale unless specifically indicated.

Figure 2:
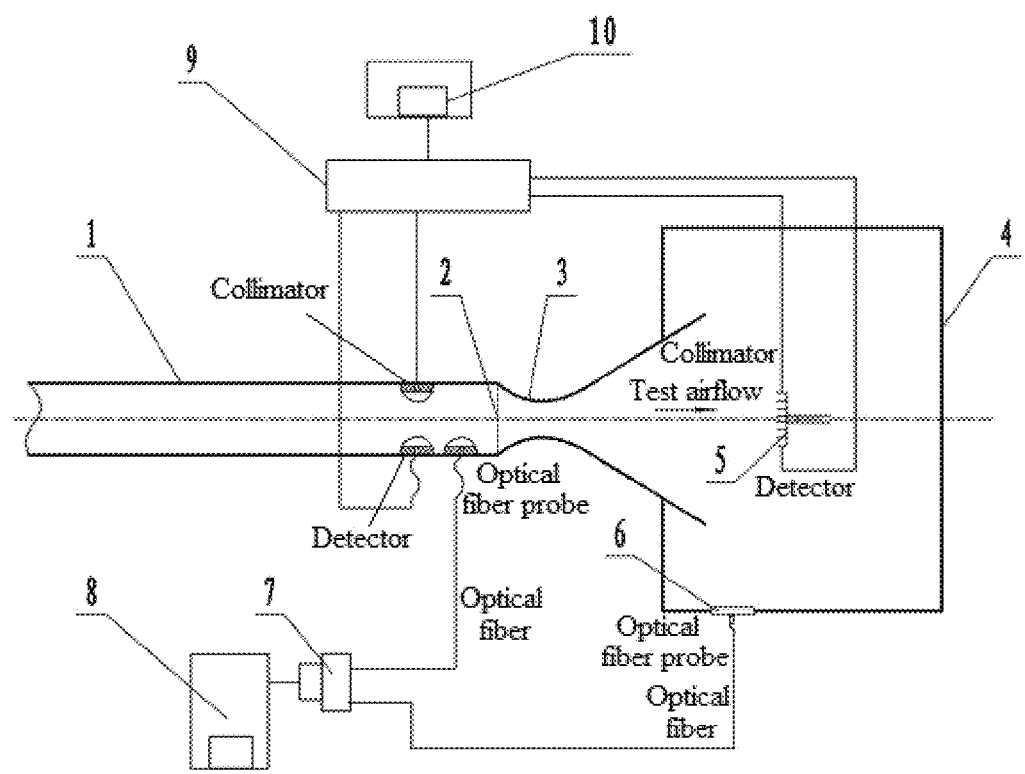

As shown in FIG. 2, a system for diagnosing high-enthalpy shock tunnel flow field parameters may include piezoelectric sensors, a total pressure sensor, an absorption spectrum system 7, an emission spectrum system 9, a pitot pressure probe, a static pressure probe, a stagnation point heat flow probe, a first data processing system 8 and a second data processing system 10.

Multiple piezoelectric sensors are installed on the shock tube 1, and a total pressure sensor is installed at the end of the shock tube 1. The non-contact absorption spectrum system 7, together with a collimator and a detector of the emission spectrum system 9, are installed near the total pressure sensor at the end of the shock tube 1. The non-contact absorption spectrum system 7, together with a collimator and a detector of the emission spectrum system 9, are installed in the test section 4, where an optical fiber probe of the absorption spectrum system 7 is arranged at an optical window 6 of the test section 4. A pitot pressure probe, a static pressure probe, and a stagnation point heat flow probe are installed on a bracket 5 in the test section 4 to measure the pitot pressure, static pressure, and stagnation point heat flow of the flow field in the test section. The data measured by the non-contact absorption spectrum system 7, the emission spectrum system 9, the pitot pressure probe, static pressure probe, and stagnation point heat flow probe, are sent to the first data processing system 8 and the second data processing system 10 respectively via optical fibers or data lines for data processing.

The measurement wavelength band of the emission spectrum system 9 is 0.1 μm to 6 μm, which depends on spectral information of the parameters of the reservoir at the end the shock tube 1 and the free flow at the high-enthalpy nozzle 3.

The non-contact absorption spectrum system 7 measures the concentrations of components NO and O in the reservoir at the end of the shock tube 1 and in the nozzle free flow by NO and O lasers. The temperature of the reservoir at the end of the shock tube 1 and the temperature of the free flow at the high-enthalpy nozzle 3 is measured via a spectral line by a near-infrared detection device, where the near-infrared detection device is installed on the cross bracket 5 in the test section. Two spectral lines are configured to measure the velocity, and the angle between the two optical paths for the velocity measurement ranges in 30°~60°.

The laser schlieren system penetrates the self-illumination flow field at the outlet of the high-enthalpy nozzle 3 and filters the self-illumination to capture a clear shock detached distance of the head of a sphere. The monochromatic laser source penetrates the strong light and high temperature region, and a clear flow field structure can be observed through a matching filter arranged in front of the camera.

The first data collection system 8 and the second data collection system 10 are each configured with a PXI test platform with a collection frequency higher than 100 kHz, where multi-channel cascade is implemented by cascading multiple sets of PXIe chassis.

Figure 1:
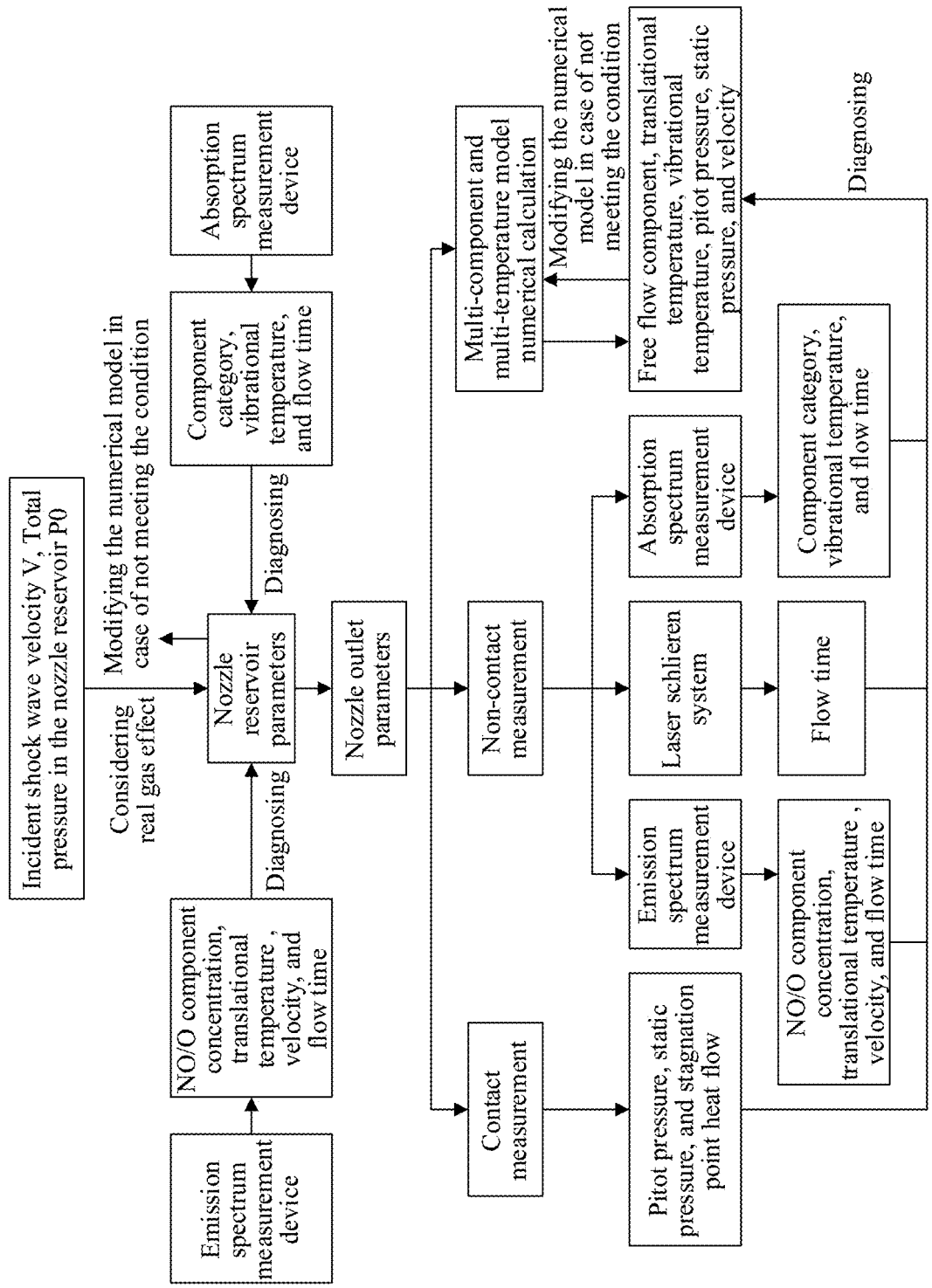
FIG. 1 is a flow chart illustrating a method for diagnosing high-enthalpy shock tunnel flow field parameters according to the present disclosure.

As shown in FIG. 1, the present disclosure provides a method for diagnosing high-enthalpy shock tunnel flow field parameters, which is a feasible approach tested by experiments for the diagnosis of high-enthalpy flow field parameters. The core point is to utilize contact measurement technology, laser schlieren technology, non-contact absorption spectrum measurement technology, non-contact emission spectrum measurement technology, and multi-component and multi-temperature numerical simulation technology to conjointly diagnose the parameters of the reservoir at the end of the shock tube 1 and the parameters of the nozzle free flow in the high-enthalpy shock tunnel. If the results meet the requirements of the flow field, that is, if the test measurement results match the numerical simulation results, the diagnosis of the high-enthalpy shock tunnel flow field parameters is completed. The present disclosure can not only obtain flow field temperature, pressure, flow field component category and component concentration, but also obtain the flow field non-equilibrium state information and the effective wind tunnel working time.

In step 1, a series of piezoelectric sensors are installed on the shock tube 1, and a total pressure sensor is installed at the end of the shock tube 1. The non-contact absorption spectrum system 7, together with a collimator and a detector of the emission spectrum system 9, are installed near the total pressure sensor at the end of the shock tube 1. Additionally, the non-contact absorption spectrum system 7, together with a collimator and a detector of the emission spectrum system 9, are also installed in the test section 4. A pitot pressure probe, a static pressure probe, and a stagnation point heat flow probe are installed on the cross bracket 5 in the test section 4. The data measured by the non-contact absorption spectrum system 7, the emission spectrum system 9, the pitot pressure probe, static pressure probe, and stagnation point heat flow probe, are respectively sent to the first data processing system 8 and the second data processing system 10 via optical fibers or data lines for data processing. Further, a diaphragm 2 is arranged between the shock tube 1 and the high-enthalpy nozzle 3.

In step 2, a time interval $\Delta t$ for an incident shock wave passing through the piezoelectric sensors is measured by the piezoelectric sensors arranged on the upper wall of the shock tube 1, the velocity V of the incident shock wave can be calculated by $V=\Delta L/\Delta t$ based on the distance $\Delta Z$ between the piezoelectric sensors.

In step 3, the total pressure $P_0$ in the reservoir at the end of shock tube 1 after the incident shock wave is reflected is measured by using the total pressure sensor arranged on the wall of the end of the shock tube 1. The parameters of the reservoir under high temperature condition are calculated based on the measured velocity V of the incident shock wave, the total pressure $P_0$ of the reservoir at the end of the shock tube 1 and the thermodynamic data of high temperature air.

In step 4, the translational temperature and NO/O component concentration, and the like, of the gas in the reservoir at the end of the shock tube 1 and the free flow gas at the high-enthalpy nozzle 3 are measured by using the non-contact absorption spectrum system 7.

In step 5, the vibration temperature and component spectral information of the gas in the reservoir at the end of the shock tube 1 and the free flow gas in the high-enthalpy nozzle 3 are measured by the emission spectrum system 9 installed at the end of the shock tube 1 near the total pressure sensor and in the test section to measure.

In step 6, a sphere is installed in the uniform flow field region of the test section 4, and the structure of the flow field around the sphere is measured by using the laser schlieren system to obtain the distance of the shock wave at the head of the sphere.

In step 7, a pitot pressure probe, a static pressure probe and a stagnation point heat flow probe are installed in the uniform flow field region of the test section 4 to obtain the pitot pressure, static pressure and stagnation point heat flow of the flow field.

In step 8, the parameters of the reservoir at the end of the shock tube 1 under high temperature condition (2000K~10000K) are calculated based on the velocity V of the incident shock wave measured in the step 2, the total pressure $P_0$ of the reservoir at the end of the shock tube 1 measured in the step 3, a thermodynamic numerical model of high temperature air and quasi-one-dimensional shock tube theory. The parameters of the reservoir at the end of the shock tube 1 is compared with the measured temperature and NO/O component concentration in the reservoir at the end of the shock tube 1; if the difference between the two data is greater than 4%, then the thermodynamic numerical model needs to be modified, and iteration is performed until the difference of the two data is ≤4%.

In step 9, the initial condition of the low field at the high-enthalpy nozzle 3 is calculate by taking the parameters (after the iteration in the step 8) of the reservoir at the end of the shock tube 1 as input. The calculation of the flow field at high-enthalpy nozzle 3 is performed by using a multi-component and multi-temperature thermochemical non-equilibrium numerical simulation method to obtain outlet parameters at the high-enthalpy nozzle 3. Upon comparing the outlet parameters at the high-enthalpy nozzle 3 with the measured data in steps 3 to 7, if the difference between the two data is greater than 6%, the numerical model needs to be modified, and iteration is performed until the difference between the two data is ≤6%.

The gas components of the free flow in the reservoir of the high-enthalpy nozzle 3 and at the outlet of the nozzle are measured by the emission spectrum system 9, and the effective wind tunnel working time t1 is determined according to whether or not a driver gas component exists.

The NO/O concentrations of the free flow in the reservoir of the high-enthalpy nozzle 3 and at the outlet of the nozzle are measured by the non-contact absorption spectrum system 7 to determine the effective wind tunnel working time t2.

The effective wind tunnel working time t3 is determined according to a shock detached distance at the head of the sphere, which is captured by the laser schlieren system; and the minimum one among the time t1, time t2 and time t3 is taken as the effective wind tunnel working time, wherein the shock detached distance is captured.

In the present disclosure, contact measurement technology, laser schlieren technology, non-contact absorption spectrum measurement technology, non-contact emission spectrum measurement technology and multi-component and multi-temperature numerical simulation technology are utilized to conjointly diagnose the parameters of the reservoir at the end of shock tube 1 and the parameters of the nozzle free flow in the high-enthalpy shock tunnel. Not only the flow field temperature, pressure, flow field component category and component concentration can be obtained, but also the flow field non-equilibrium state information and the effective wind tunnel working time can be obtained. A high-enthalpy flow field parameter measurement platform can be established by using the method for diagnosing the high-enthalpy shock win tunnel flow field parameters according to the present disclosure, which has extremely high sensitivity, continuous time resolution and rapid time response and is preferable.

The content that is not described in detail in the present disclosure is well known to those skilled in the art.

The invention claimed is:

1. A method for diagnosing high-enthalpy shock tunnel flow field parameters, comprising:

step 1, installing a plurality of piezoelectric sensors on a shock tube and a total pressure sensor at an end of the shock tube; installing a non-contact absorption spectrum system together with a collimator and a detector of an emission spectrum system near the total pressure sensor at the end of the shock tube, and installing the non-contact absorption spectrum system together with another collimator and another detector of the emission spectrum system in a test section; installing a pitot pressure probe, a static pressure probe, and a stagnation point heat flow probe on a bracket in the test section to measure pitot pressure, static pressure, and stagnation point heat flow in a flow field of the test section; and sending the data measured by the non-contact absorption spectrum system, the emission spectrum system, the pitot pressure probe, the static pressure probe, and the stagnation point heat flow probe to a first data processing system and a second data processing system (10) via optical fibers or data lines for data processing;

step 2, measuring a time interval Δt for an incident shock wave passing through the piezoelectric sensors by using the piezoelectric sensors arranged on an upper wall of the shock tube, and calculating a velocity V of the incident shock wave by V=ΔL/Δt based on a distance ΔL between the piezoelectric sensors;

step 3, measuring, by using the total pressure sensor arranged on a wall of the end of the shock tube, a total pressure $P_0$ in a reservoir at the end of shock tube after the incident shock wave is reflected;

step 4, measuring translational temperatures and NO and O component concentrations of gas in the reservoir at the end of the shock tube and free flow gas in a high-enthalpy nozzle by using the non-contact absorption spectrum system;

step 5, measuring vibrational temperatures and component spectral information of the gas in the reservoir at the end of the shock tube and the free flow gas in the nozzle by using the emission spectrum system;

step 6, installing a sphere on the cross bracket in the test section, and measuring a structure of the flow field around the sphere by using a laser schlieren system, to obtain a shock detached distance at a head of the sphere;

step 7, obtaining the pitot pressure, the static pressure and the stagnation point heat flow of the flow field by the pitot pressure probe, the static pressure probe and the stagnation point heat flow probe;

step 8, calculating parameters of the reservoir at the end of the shock tube under high temperature condition based on the velocity V of the incident shock wave measured in the step 2, the total pressure $P_0$ in the reservoir at the end of the shock tube measured in the step 3, a thermodynamic numerical model of high temperature air and quasi-one-dimensional shock tube theory; comparing the parameters of the reservoir at the end of the shock tube with the temperature and NO AND O component concentration in the reservoir at the end of the shock tube measured in the step 4; if a difference between two data is greater than a predetermined threshold a, modifying the thermodynamic numerical model and performing iteration until the difference between the two data is equal to or less than the predetermined threshold a;

step 9, calculating initial condition of a flow field in the high-enthalpy nozzle by taking the parameters of the reservoir at the end of the shock tube obtained after the iteration in the step 8 as input, calculating the flow field of the high-enthalpy nozzle by using a multi-component and multi-temperature thermochemical non-equilibrium numerical simulation method to obtain outlet parameters at the high-enthalpy nozzle, and comparing the outlet parameters at the high-enthalpy nozzle with the measured data in steps 3 to 7; if a difference between two data is greater than predetermined threshold b, modifying the numerical model and performing iteration until the difference between the two data is equal to or less than the predetermined threshold b.

2. The method for diagnosing high-enthalpy shock tunnel flow field parameters according to claim 1, wherein a measurement wavelength band of the emission spectrum system is from 0.1 μm to 6 μm, which depends on spectral information of free flow parameters of the reservoir at the end the shock tube and the high-enthalpy nozzle.

3. The method for diagnosing high-enthalpy shock tunnel flow field parameters according to claim 2, further comprising measuring concentrations of components NO and O in the reservoir at the end of the shock tube and in free flow of the nozzle by using NO and O lasers in the non-contact absorption spectrum system; and measuring temperature in the reservoir at the end of the shock tube and temperature of the free flow at the high-enthalpy nozzle via a spectral line by using a near-infrared detection device, wherein the near-infrared detection device is installed on the cross bracket in the test section, two spectral lines are used to measure velocity, and an angle between two optical paths for the velocity measurement ranges between 30° and 60°.

4. The method for diagnosing high-enthalpy shock tunnel flow field parameters according to claim 3, further comprising capturing a clear shock detached distance at the head of the sphere by penetrating a self-illumination flow field at an outlet of the high-enthalpy nozzle and filtering the self-illumination via the laser schlieren system, wherein a monochromatic laser source is configured to penetrate strong light and high temperature region, and a clear flow field structure is observable through a matching filter arranged in front of a camera.

5. The method for diagnosing high-enthalpy shock tunnel flow field parameters according to claim 4, wherein a wavelength range of the monochromatic laser source in the laser schlieren system is from 520 nm to 720 nm.

6. The method for diagnosing high-enthalpy shock tunnel flow field parameters according to claim 5, wherein the first data processing system and the second data processing system are each configured with a PXI test platform having a collection frequency greater than 100 kHz, wherein multiple sets of PXIe chassis are cascaded to implement a multi-channel cascade.

7. The method for diagnosing high-enthalpy shock tunnel flow field parameters according to claim 1, further comprising:
measuring gas components in a reservoir of the high-enthalpy nozzle and gas components of free flow at an outlet of the nozzle, by using the emission spectrum system, and determining an effective wind tunnel working time t1 according to whether or not a driver gas component exists;
determining an effective wind tunnel working time t2 by measuring NO AND Q concentrations in the reservoir of the high-enthalpy nozzle and NO AND O concentrations of the free flow at the outlet of the nozzle using the non-contact absorption spectrum system; and
determining an effective wind tunnel working time t3 according to the shock detached distance at the head of the sphere, which is captured by the laser schlieren system, and taking a minimum one among the time t1, time t2 and time t3 as the effective wind tunnel working time.

8. A system for diagnosing high-enthalpy shock tunnel flow field parameters, comprising piezoelectric sensors, a total pressure sensor, an absorption spectrum system, an emission spectrum system, a pitot pressure probe, a static pressure probe, a stagnation point heat flow probe, a first data processing system and a second data processing system, wherein: the piezoelectric sensors are installed on a shock tube and the total pressure sensor is installed at an end of the shock tube; the non-contact absorption spectrum system and a collimator and a detector of the emission spectrum system, are installed near the total pressure sensor at the end of the shock tube, and the non-contact absorption spectrum system and another collimator and another detector of the emission spectrum system are installed in a test section;
the pitot pressure probe, the static pressure probe, and the stagnation point heat flow probe are installed on a bracket in the test section to measure pitot pressure, static pressure, and stagnation point heat flow in the flow field of the test section; wherein the data measured by the non-contact absorption spectrum system and the emission spectrum system, the pitot pressure probe, the static pressure probe, and the stagnation point heat flow probe are sent to the first data processing system and the second data processing system via optical fibers or data lines for data processing.

9. The system for diagnosing high-enthalpy shock tunnel flow field parameters according to claim 8, wherein a measurement wavelength band of the emission spectrum system is from 0.1 μm to 6 μm, which depends on spectral information of free flow parameters of a reservoir at the end the shock tube and a high-enthalpy nozzle.

10. The system for diagnosing high-enthalpy shock tunnel flow field parameters according to claim 9, wherein
the non-contact absorption spectrum system is configured to measure concentrations of components NO and O in the reservoir at the end of the shock tube and in free flow of the nozzle by using NO and O lasers; and
a near-infrared detection device is configured to measure temperature in the reservoir at the end of the shock tube and temperature of the free flow at the high-enthalpy nozzle via a spectral line, wherein the near-infrared detection device is installed on the cross bracket in the test section, two spectral lines are used to measure velocity, and an angle between two optical paths for the velocity measurement ranges between 30° and 60°.

11. The system for diagnosing high-enthalpy shock tunnel flow field parameters according to claim 10, wherein a laser schlieren system is configured to capture a clear shock detached distance at a head of a sphere by penetrating a self-illumination flow field at an outlet of the high-enthalpy nozzle and filtering the self-illumination, wherein a monochromatic laser source is configured to penetrate strong light and high temperature region, and a clear flow field structure is observable through a matching filter arranged in front of a camera.

12. The system for diagnosing high-enthalpy shock tunnel flow field parameters according to claim 11, wherein a wavelength range of the monochromatic laser source in the laser schlieren system is from 520 nm to 720 nm.

13. The system for diagnosing high-enthalpy shock tunnel flow field parameters according to claim 12, wherein the first data processing system and the second data processing system are each configured with a PXI test platform having a collection frequency greater than 100 kHz, wherein multiple sets of PXIe chassis are cascaded to implement a multi-channel cascade.

* * * * *